INVENTORS.
ROBERT J. FOXX
EDWARD H. KRAUSE, JR.
BY
Parker & Carter
ATTORNEYS.

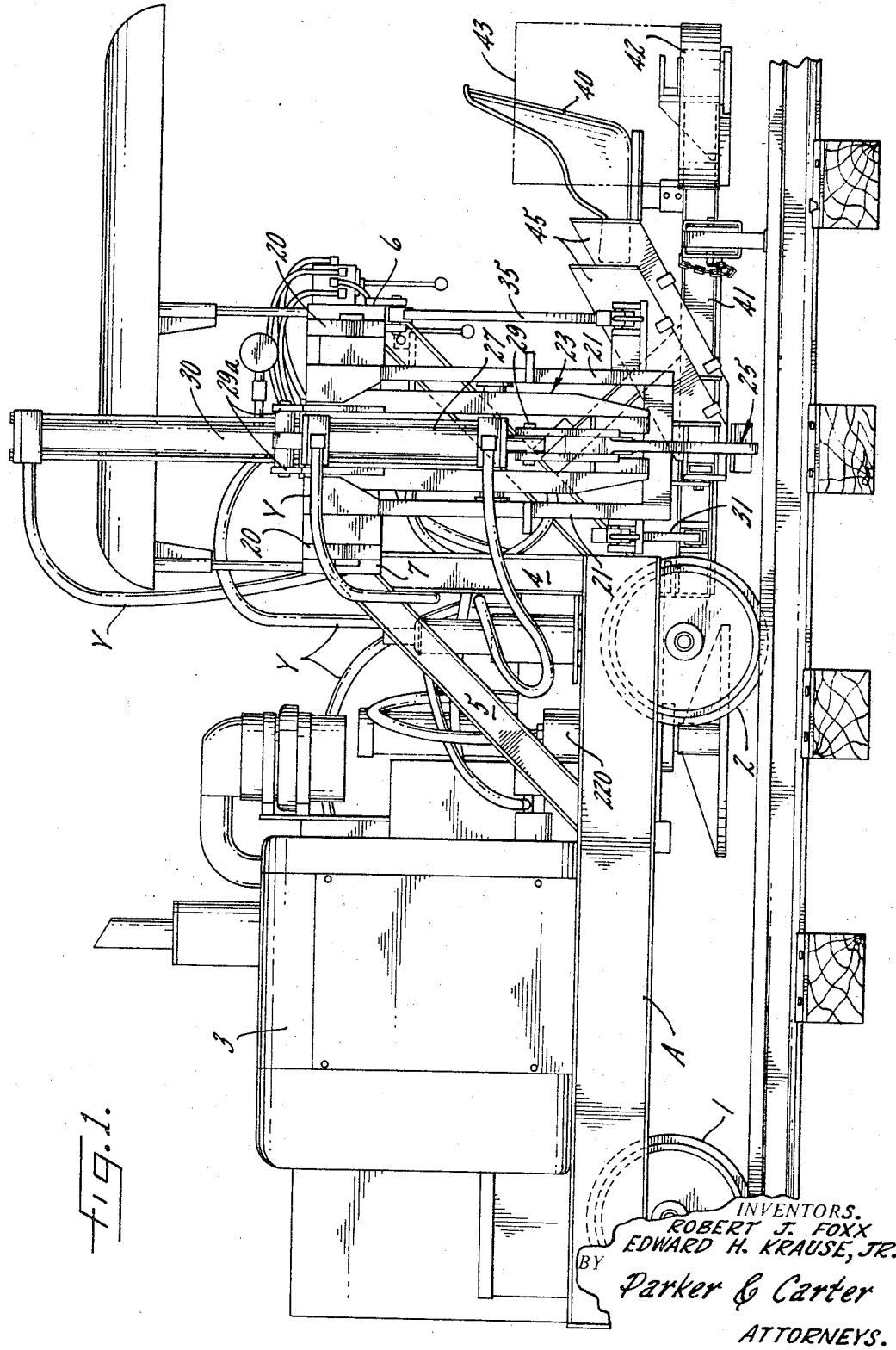

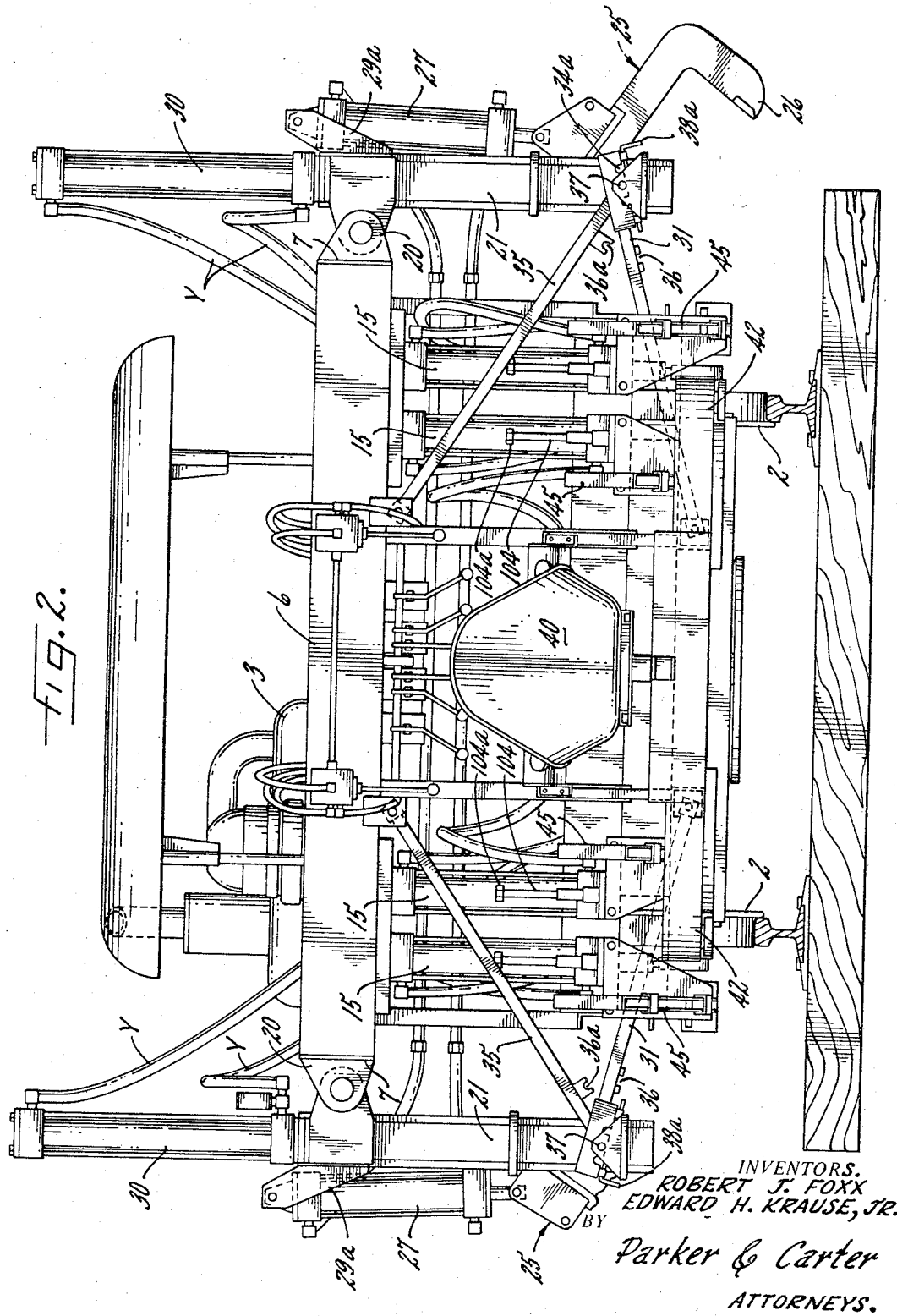

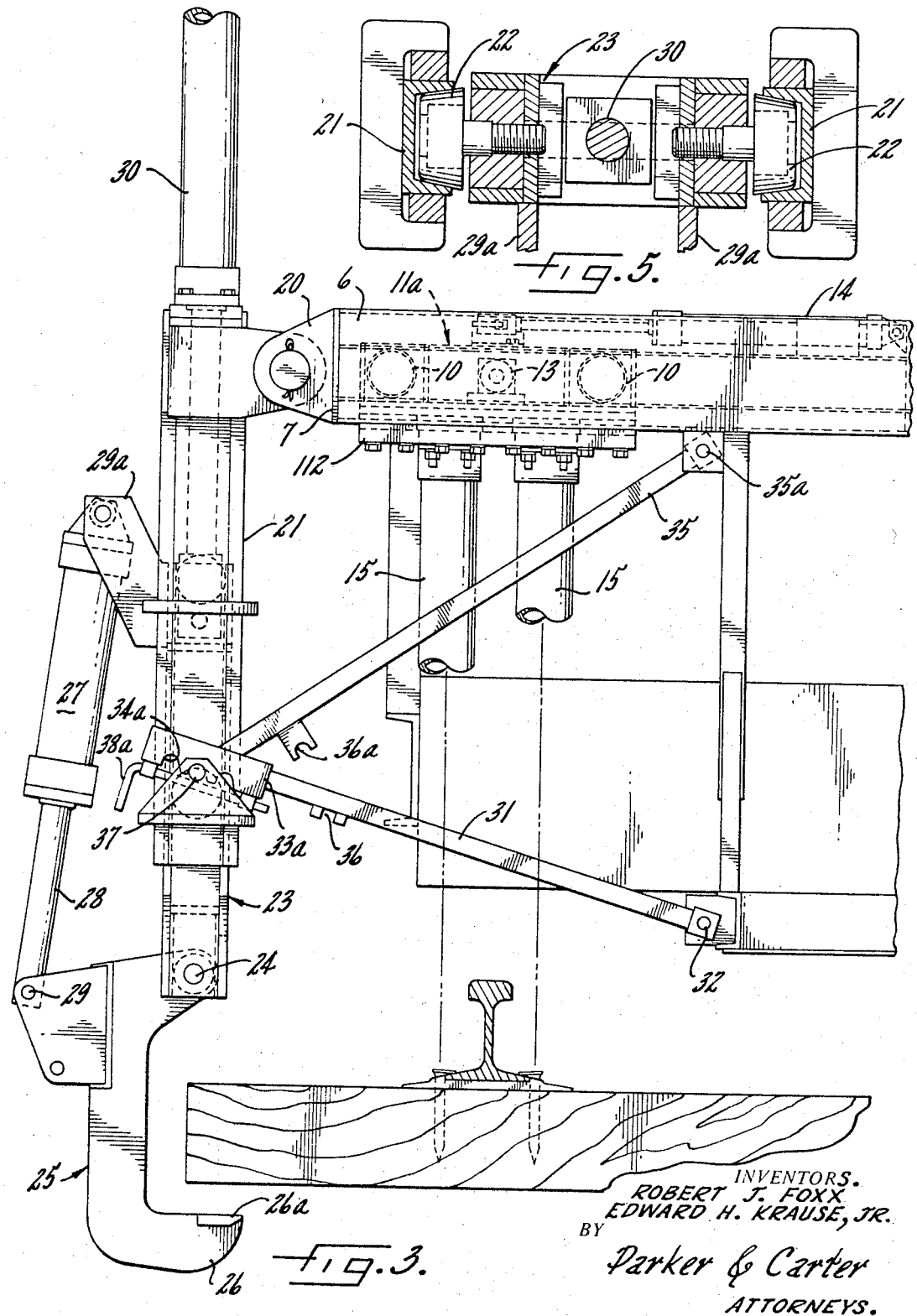

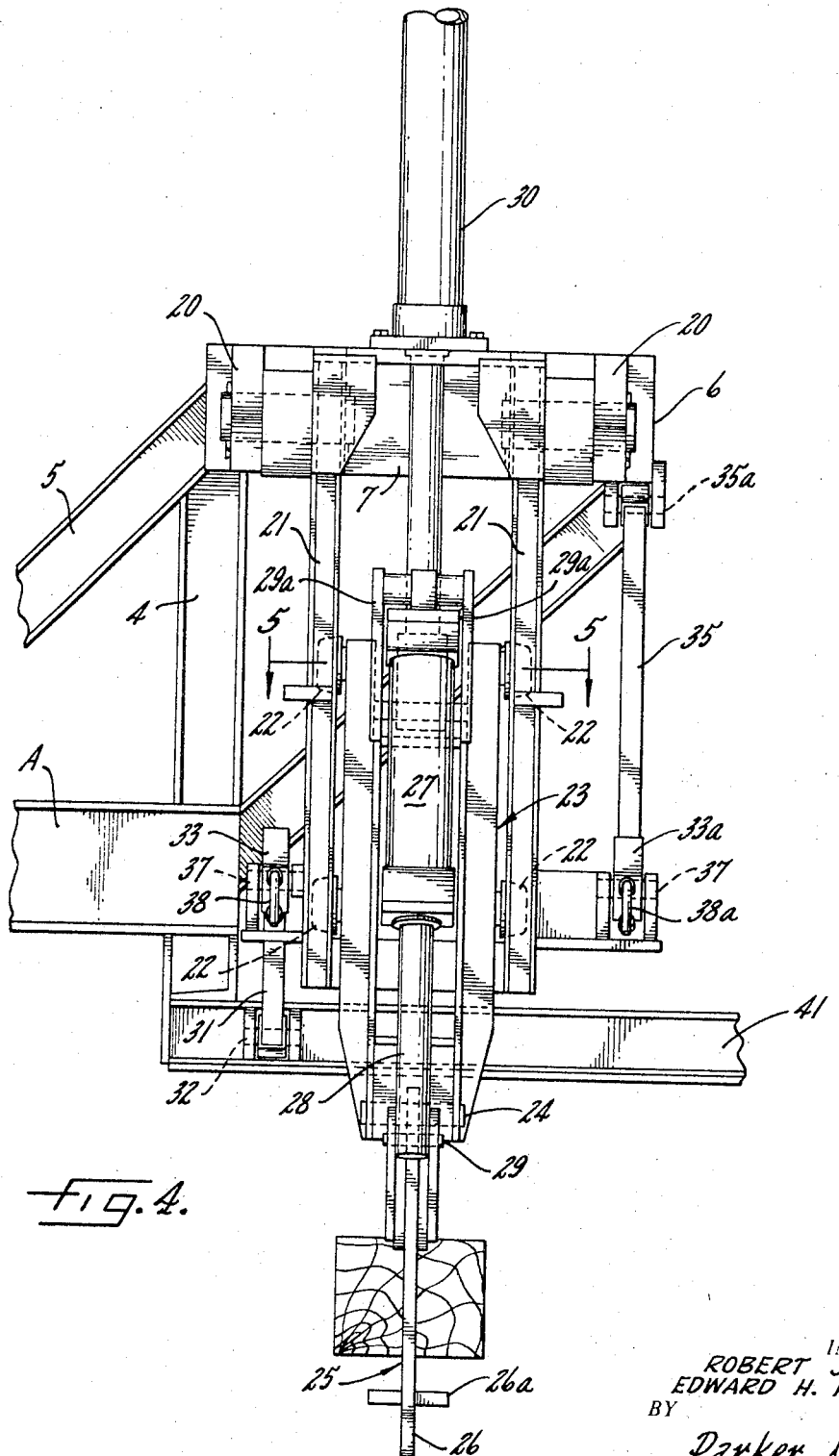

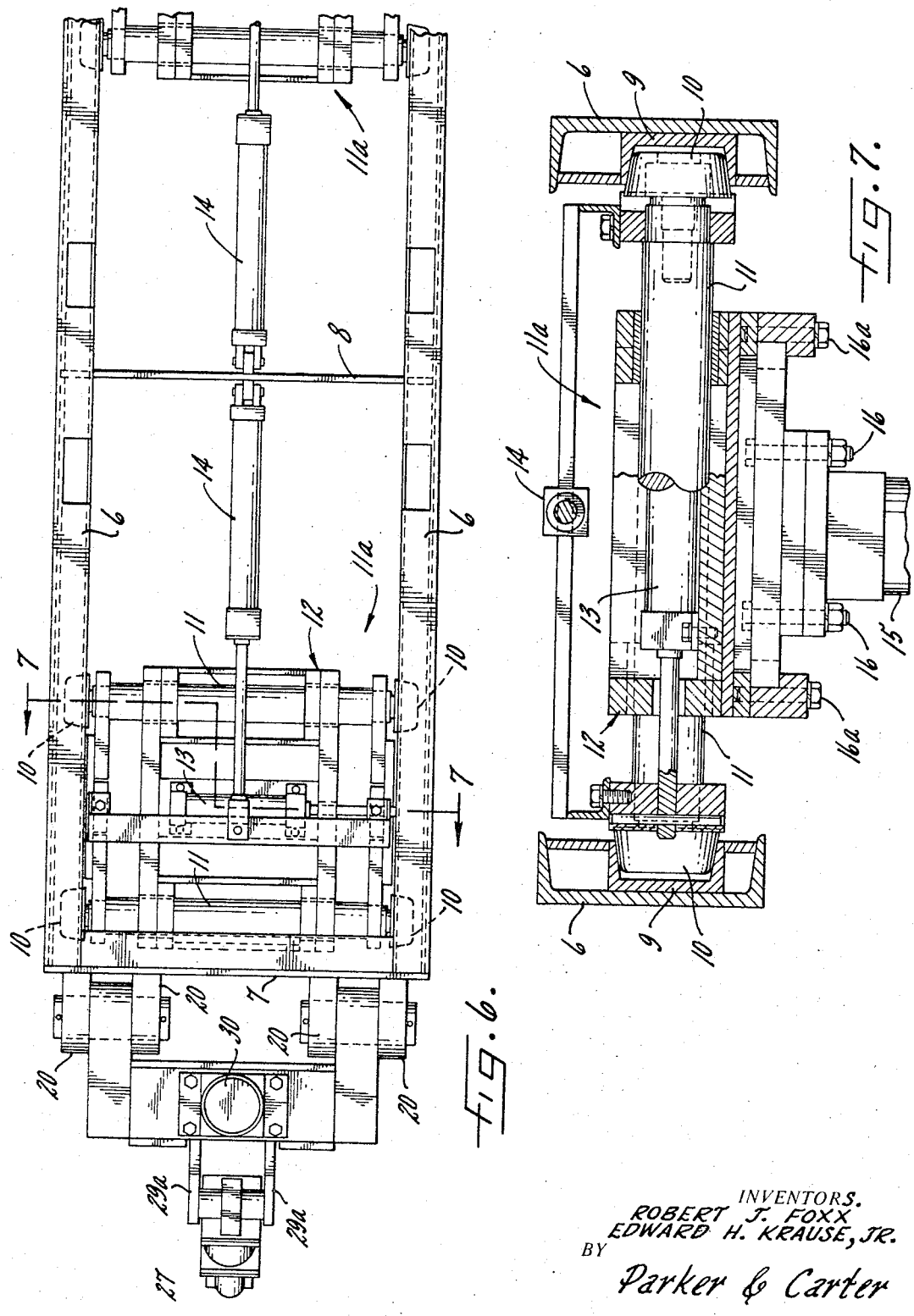

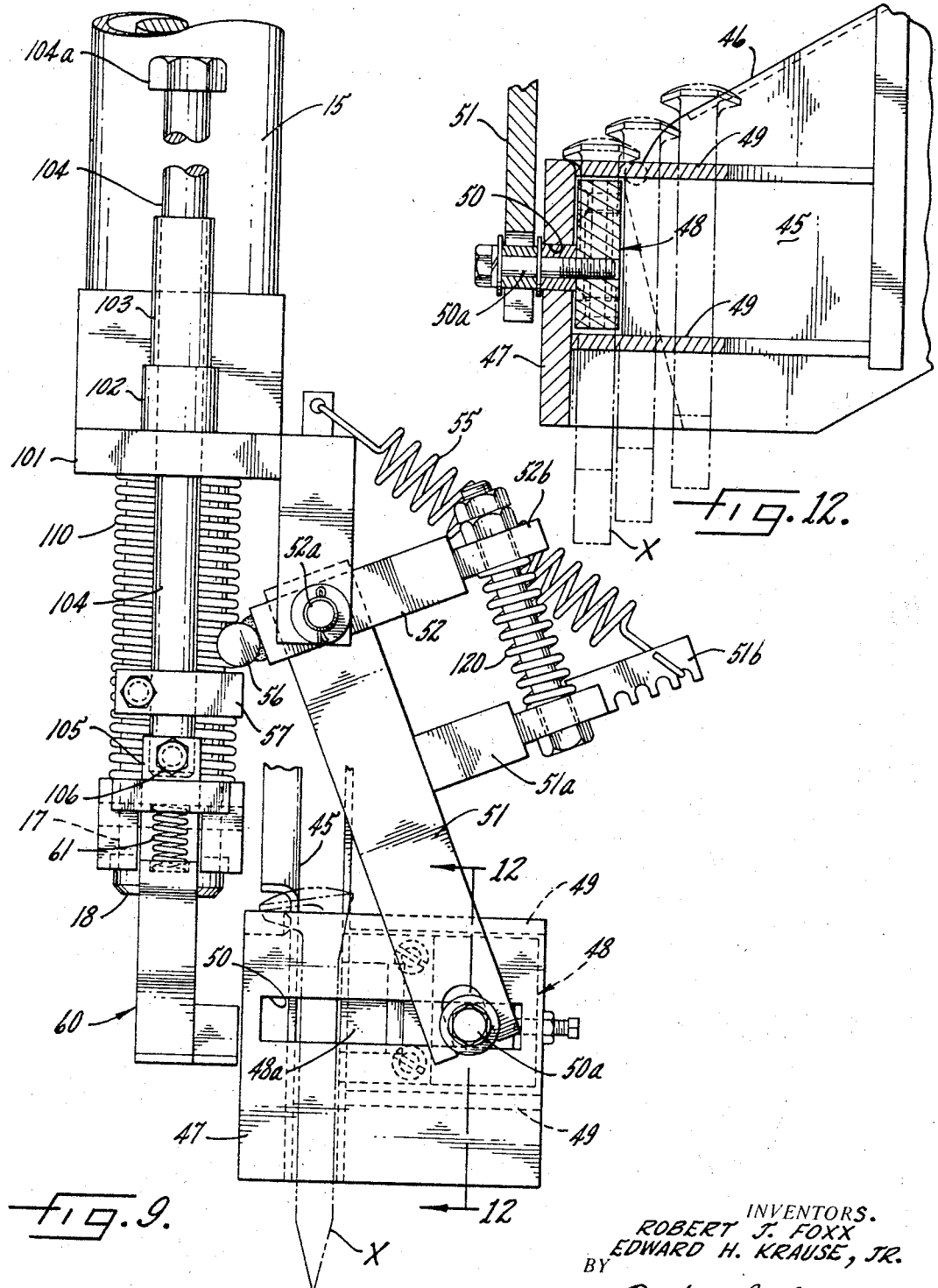

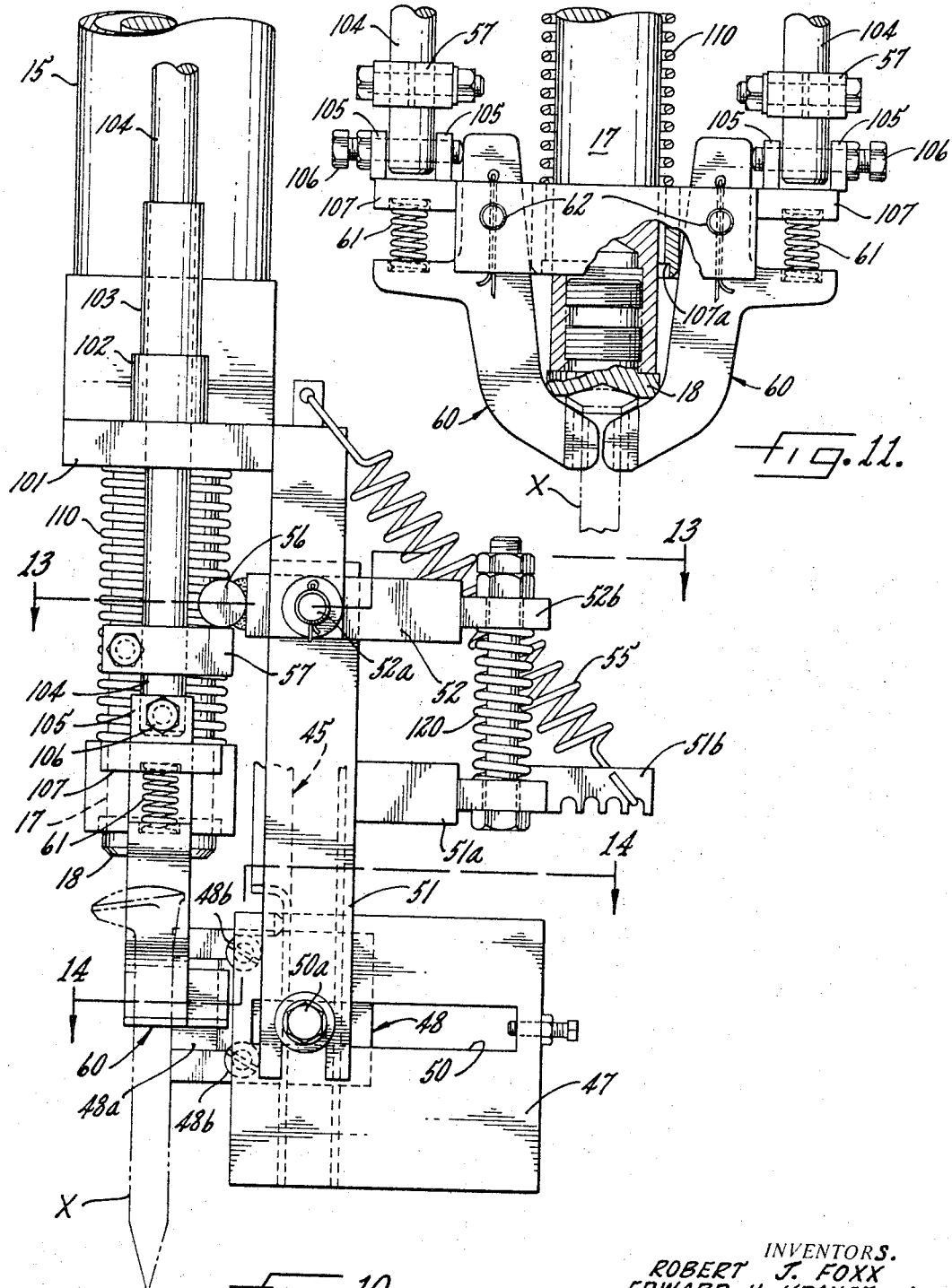

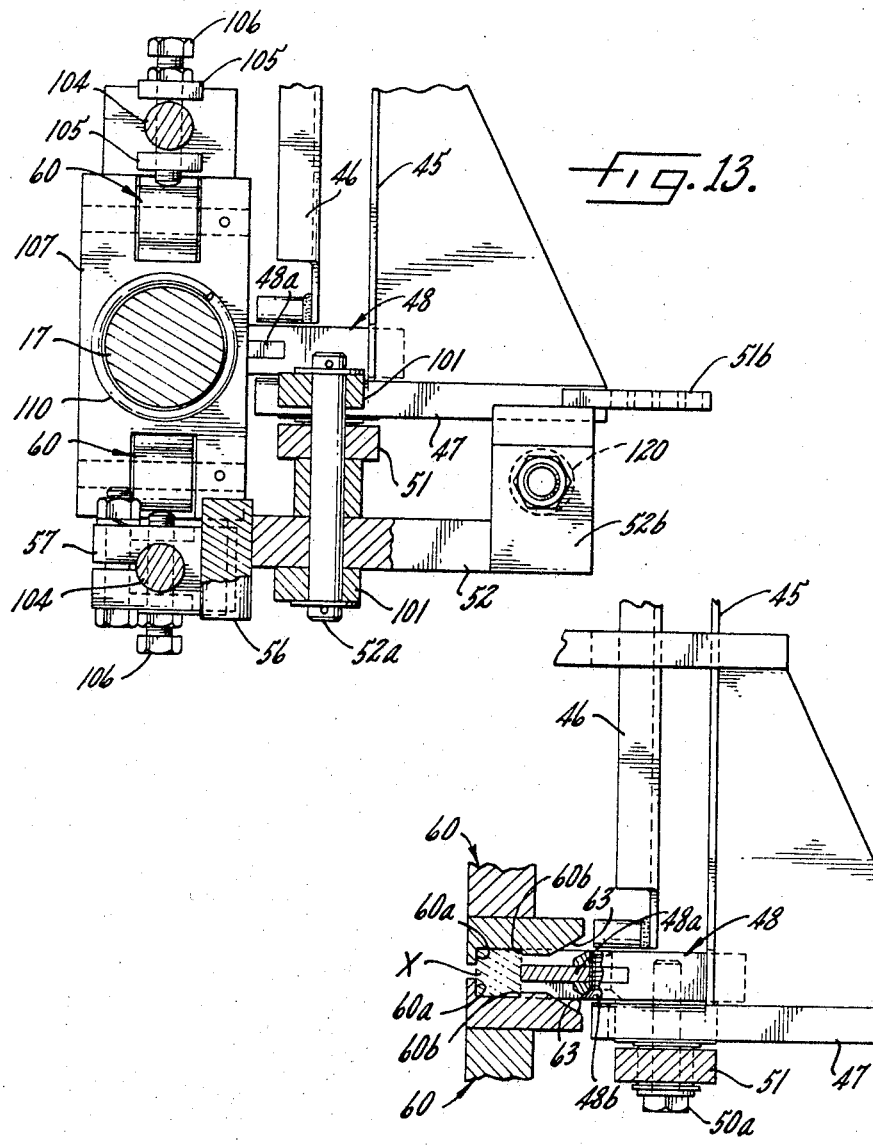

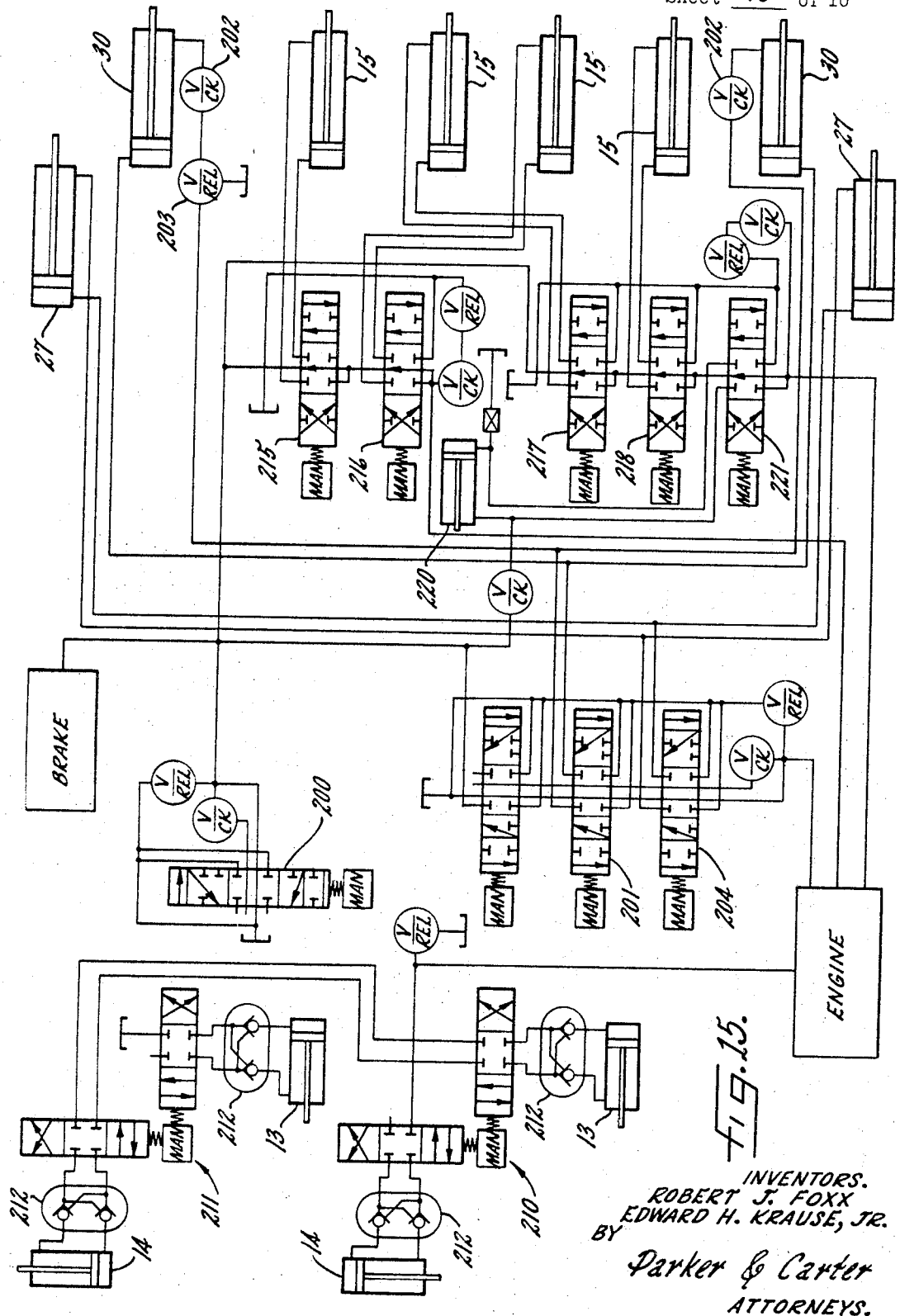

United States Patent Office 3,426,698
Patented Feb. 11, 1969

3,426,698
SPIKE DRIVER
Robert J. Foxx, Metuchen, N.J., and Edward H. Krause, Jr., New Berlin, Wis., assignors to Nordberg Manufacturing Company, Milwaukee, Wis., a corporation of Wisconsin
Filed June 28, 1965, Ser. No. 467,500
U.S. Cl. 104—17          15 Claims
Int. Cl. E01b 29/16, 29/26

ABSTRACT OF THE DISCLOSURE

A spike driving machine which is hydraulically operated and constructed to drive spikes on a selected basis into the ties of railroad track while gripping the ties to prevent the ties from being forced further into the ballast. The machine has an accurate positioning mechanism so that the spikes can be accurately positioned over the previously drilled spike holes.

---

Figure 8:
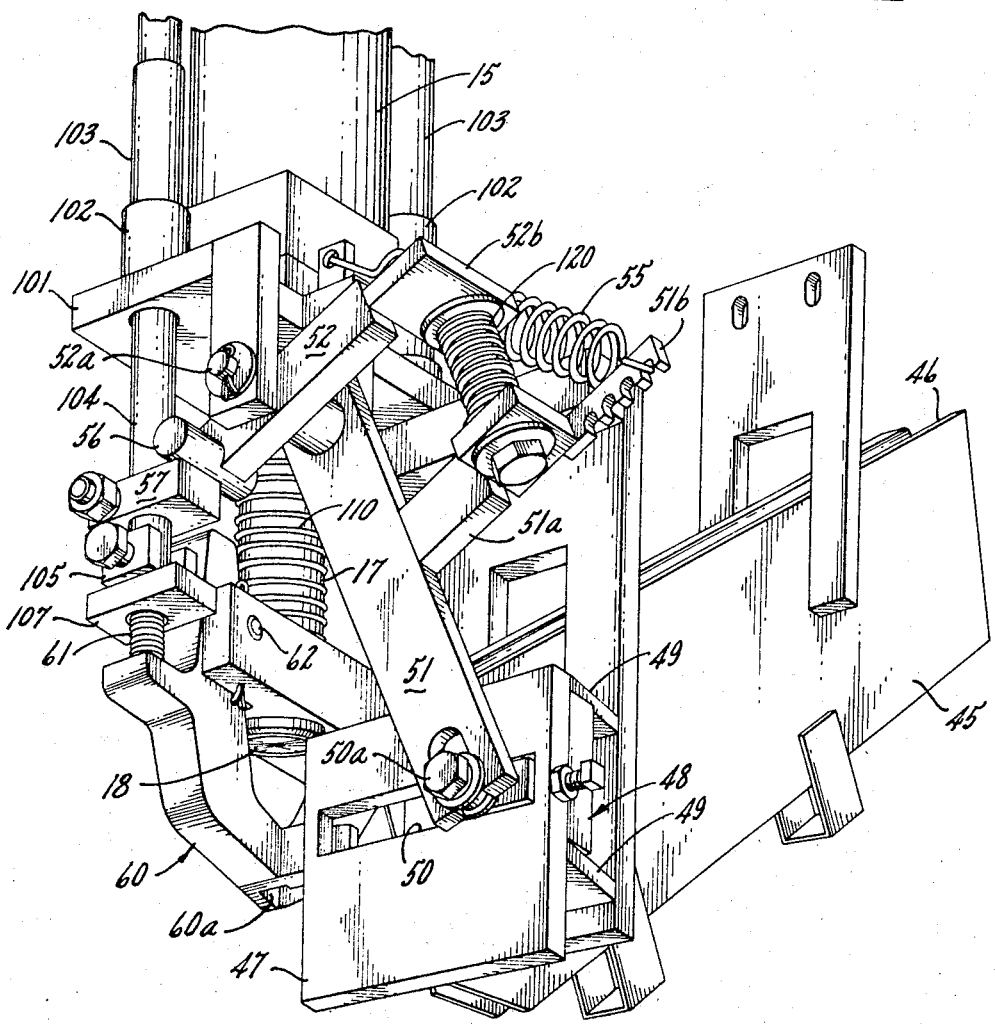

The invention relates to an improvement in spike driving devices for railroad track and the like. One purpose is to provide an improved means and method for driving spikes in which the spikes are forced into the tie by the application of hydraulic pressure.

Another purpose is to provide such a device in which improved means are provided for holding the ties against downward movement during the application of hydraulic pressure.

Another purpose is to provide improved tie nipping means for such a device which shall be readily adaptable to ties of various size and length.

Another purpose is to provide tie nipping means for such a device in which upward pressure against the tie is so limited as to prevent unintended bending or breakage of the tie.

Another purpose is to provide improved hydraulic spike driving means.

Another purpose is to provide an improved jaw system for holding spikes in position during their initial insertion into the tie.

Another purpose is to provide improved means for feeding the spikes into the jaws, to be held by the jaws during the initiation of the spike driving movement.

Another purpose is to provide improved means for permitting the release of the jaws after the initiation of the spike driving operation, whereby the thrusting anvil may pass between the jaws and complete the driving of the spike.

Another purpose is to provide a device of the type described in which a plurality of spikes may be simultaneously driven, either at one or at both rails of the track simultaneously.

Another purpose is to provide improved adjusting means for adjusting spike driving carriages on the frame of the mechanism, whereby to locate or spot the spike driving cylinders and anvils properly in relation to the holes of the spikes to be driven.

Another purpose is to provide means for adjusting the relative position to each other of a plurality of spike driving units.

Another purpose is to provide improved means for feeding a succession of spikes to proper position for subsequent insertion, one at a time, into holding jaws properly positioned for the spike driving operations.

Other purposes will appear from time to time in the course of the specification and claims.

We illustrate our invention more or less diagrammatically in the accompanying drawings, wherein:

FIGURE 1 is a side elevation;

FIGURE 2 is an end elevation;
FIGURE 3 is a partial end elevation on a somewhat enlarged scale;
FIGURE 4 is a side view of FIGURE 3;
FIGURE 5 is a section on the line 4—4 of FIGURE 4 on an enlarged scale;
FIGURE 6 is a partial plan view;
FIGURE 7 is a section on an enlarged scale along line 7—7 of FIGURE 6;
FIGURE 8 is a perspective view of the means for feeding spikes and the spike receiving jaw mechanism;
FIGURE 9 is a detail of the spike feeding mechanism;
FIGURE 10 is a view similar to FIGURE 9 illustrating the spike in position as fed to the spike gripping jaws;
FIGURE 11 is a partial elevation of the left side of the structure shown in FIGURE 10, partly in section;
FIGURE 12 is a section on the line 12—12 of FIGURE 9;
FIGURE 13 is a section along line 13—13 of FIGURE 10;
FIGURE 14 is a section along line 14—14 of FIGURE 10; and
FIGURE 15 is a hydraulic diagram.

Referring to the drawings, A generally indicates a frame structure, the details of which do not of themselves form part of the invention. This frame is carried on flanged rail engaging wheels 1, 2. 3 diagrammatically illustrates an engine, pump and oil reservoir assembly, the details of which do not of themselves form part of the present invention. It will be understood that an oil reservoir with a plurality of pumps may be employed, as shown in FIGURE 15. At the right hand of the frame A, referring to the position shown in FIGURE 1, are upright frame elements 4 and inclined frame elements 5, upon the upper ends of which are secured a crossbeam structure having side beams 6 and a connecting end portion 7 in the form generally of a frame as shown, for example, in FIGURES 6 and 7. It will be understood that each end of the structure may be identical, and an intermediate crosspiece 8 is indicated. Within each of the beams 6 are tracks 9 along which run any suitable wheels or rollers 10 mounted at the ends of longitudinally extending pins or axles 11 on a main carriage 11a. A sub-carriage, generally indicated as 12, on the main carriage, may be adjusted along the axles 11, for example, by a suitable hydraulic cylinder 13 in a direction generally parallel to the rails. Similarly, the main carriages, of which there is one at each of the tracks 9, may be traversed transversely of the rails by hydraulic cylinders 14. Secured to each of the sub-carriages 12, and depending therefrom, are two spike driver cylinders, generally indicated as 15. They may be suitably adjusted on the sub-carriage 12, for example, by suitable bolts 16 which permit manual longitudinal adjustment relative to the rails. Bolts 16a permit transverse adjustment relative to the rails. Therefore, taking the two carriages together, a pair of drive cylinders depends generally vertically from each sub-carriage, in a staggered relationship, for proper spotting over places where spikes are to be driven or over tie plate apertures to receive spikes. The operator, by adjusting the main carriages 11a along the tracks 9, and by adjusting the sub-carriages 12 on axles 11, can obtain a precise spotting of the driving cylinders over the locations where spikes are to be driven. Such an alignment is indicated, for example, in FIGURE 3, the axes of the driving cylinders 15 being linearly extended to indicate the location of spikes to be driven.

It will be understood that a steady hydraulic thrust is employed, with no impacting of the spike. Each of the driving cylinders 15 carries a piston rod, for example, illustrated at 17 in FIGURE 10, which terminates in a spike contacting anvil 18. At the bottom of each cylinder 15 is indicated, as in FIGURES 9 and 10, a cross-supporting plate 101 which carries at its outer ends sleeves 102 with extensions 103 to receive guide rods 104. Each guide rod 104 at its lower end is received between ears 105, in FIGURE 11, through which pass bolts 106, the ears extending from a crosspiece or supporting block 107. These blocks are suitably apertured to permit the passage therethrough of the piston rod 17 which terminates in the spike contacting anvil 18. Pivoted to the crosspiece 107 are a pair of jaws, generally indicated at 60, they being pivoted, for example, on pins 62, and being spring-biased to the closing position in which they are shown in FIGURE 11 by suitable springs 61. The inner ends of the bolts 106, which are adjustable, serve as stops for limiting the inner movement toward each other of the jaws 60.

It will be understood that when the piston rod or driving rod 17, with its anvil 18, descends to force one of the spikes X into the tie it moves an initial distance in unison with the jaws 60, the jaws 60 being effective to hold a spike X in the position to be driven. After a predetermined penetration of the spike into the tie the downward movement of the jaw assembly terminates, for example, by the engagement of the nuts 104a, in FIGURE 2, on the top of the guide rods 104 with the shim extension 103. Thereafter, the anvil continues its downward thrust against the spike X and drives it fully home, forcing the jaws 60 apart. They will ride upon the sides of the anvil and, upon the reverse or upward movement of the actuating piston or plunger or driving rod 17, they return to the position in which they are shown in FIGURE 11. Considering the position of the parts in FIGURE 11, the anvil 18 has extended somewhat below the member 107 to contact the jaws. Meanwhile, the spring 110 urges the member 107 to its downward position. After the spike is driven home the anvil withdraws upwardly and seats against the bushing 107a. The jaws are then in position to receive the next spike, as in FIGURE 10.

As the piston or plunger 17 moves upwardly from the position in which it is shown in FIGURE 9, a block 57 adjustably mounted on guide rod 104 strikes a cam 56 on the lever 52 fixed on a pivot 52a on the extension of the base member 101. The spring 55 normally biases the lever 52 to the position in which it is shown in FIGURE 9. As the block 57 rises and contacts the cam 56 the lever system, referring to the position in which it is shown in FIGURE 9, is rotated to the left on pivot pin 52a, to the position in which it is shown in FIGURE 10.

Aligned with the spikes to be driven we provide a plurality of spike trays 45, each having downwardly inclined upper edges 46 which support the spike head to permit the spikes to move gravitally downwardly against an end plate 47. Movable across the end plate is a pusher plate, generally indicated at 48, which serves to move the bottom spike from the tray into the jaws, and at the same time, to prevent the next spike from coming down into the assembly. It is guided in or between suitable tracks or flanges 49 for movement to the left, referring to the position in which the parts are shown in FIGURE 9. The end plate 47 is slotted as at 50 to pass the actuating connection 50a for the pusher plate. This actuating connection includes the lever 51 free on pivot 52a, as above described, so that it may rotate relative to lever 51, the lever structure being spring-loaded as by the spring 55 which biases the lever assembly counterclockwise in FIGURE 9. As the block 57 strikes the cam 56, the lever assembly rotates clockwise and the spike is pushed between the spring-loaded jaws 60. Note that the jaws are beveled as at 63 to permit the entry of the spike, as will be clear from FIGURE 14. It will also be seen from FIGURE 14 that the jaws 60 are contoured, as at 60a, to receive and stop the spike when the spike has been thrust in place and at 60b to hold the spike in place and prevent return movement. The pusher plate 48 may include a permanent holding magnet, as indicated at 48a removably and replaceably mounted on the pusher plate as at 48b. Or 48b may be a non-magnetic wearing element. This magnet holds each spike as it is thrust between the inclined or chamfered faces of the jaws 60. The spike, being thus forced between the jaws, moves the jaws slightly outwardly against the bias of the springs 61. A relatively slight opening of the jaws is all that is necessary to receive the spike.

A spring 120 serves as a cushion to prevent overthrust, the spring 120 being compressed between the extension 52b of the lever 52 and a second lateral extension 51a of the lever 51. It keeps the spike from being pushed too hard or too far. The extension 51a is shown with a spring adjustment rack 51b for the adjustment of the pusher plate return spring 55.

Referring to FIGURE 10, as the rod 17 and anvil 18 move down, supporting block 107, guide rods 104 and cam plate 57 disengage from cam 56 thereby allowing spring 55 to retract lever 51. This will move the pusher plate 48 to the right in FIGURE 10 past the open lower end of the magazine or chute thereby allowing the next spike to move into position in front of the pusher plate to be fed thereby inward, or outward, to a position between the jaws 60.

Prior to driving the spikes it is important that the ties be gripped or nipped, to resist or be restrained against the downward thrust. The tie nipping structure below described is pivoted within ears 20 extending laterally from the beam portion 7. The nipping structure includes side frame portions 21 which serve as guides or tracks for upper and lower sets of rollers 22 of a movable carriage structure, generally indicated at 23 in FIGURE 4. This carriage 23 has pivoted at its lower end, as at 24, a tie nipping hook, generally indicated as 25, which includes an abutting portion or toe 26, with a flat 26a, which may be inserted beneath the end of a tie. The hook is rotated about the pivot 24 by a suitable hydraulic cylinder 27 with its piston rod 28 secured, as at 29, to a lever extension from the hook 25, and the upper end of the cylinder pivoted on ears 29a on the carriage 23. The carriage 23 may be bodily raised and lowered, for example, by the hydraulic nipper cylinder 30. We find it advantageous, in order to position the side frame 21 at desired adjustments, to provide adjusting radius rods 31 and 35 pivoted to the frame, as at 32 and 35a, each carrying an end portion 33 and 33a having selector notches 34 and 34a. It will be understood that the nipper hook, when not in use, is elevated to inoperative position for travel and may be then held as by the notched portions 36 and 36a on rods 31 and 35 which engage the abutment pin 37 of the side frame 21. The parts are kept in adjusted position by the keys 38 and 38a.

It will be understood that the hydraulic cylinders are suitably interconnected with the pump system and oil reservoir by a multiplicity of flexible conduits, generally indicated at Y, which it is thought not necessary to describe in detail, but which are schematically shown in FIGURE 15.

An operator seat is indicated at 40, mounted on a rear platform 41 of the main frame of the device. Adjacent the seat, and at each side thereof, is a support or tub 42 adapted to receive a container or barrel 43 in which a supply of spikes may be kept.

Referring to the diagrammatic hydraulic circuit, FIGURE 15, the valve 200 controls propulsion in either direction. Pushing the control lever forward releases the brakes and moves the machine forward to slow speed. Pulling the valve lever in the opposite direction causes a backward movement of the vehicle. However, the details of propulsion will not be further described, since they do not form part of the present invention.

The tie nipping which precedes the spike driving is controlled by a suitable valve 201 which controls the nipper cylinders 30. To lower the nippers fluid is directed to the top of the cylinders, with oil from the bottom side returning to the tank, not shown in detail, through the pilot-operated check valves 202. We provide a built-in relief valve to determine a maximum pressure for lowering the nippers. For raising the nippers oil is directed to the bottom side of the cylinders 30 and oil from the top side returns to the tank. The maximum pressure for this movement is determined by the relief valve 203 which may be set at the required pressure for driving. At this setting the nipping force is insufficient to raise the front wheels of the machine from the track, or to bend the tie, while holding the tie firmly to the bottom of the rails. The pilot check valves 202 act as lock valves when the control valve 201 is in neutral. They prevent lowering of the nippers when the spikes are being driven. The locked-in pressure in the nipping cylinders is determined by the driving force and location. The result is a differential pressure in each cylinder to obtain a statically balanced force arrangement.

Hook movement is controlled by the valve 204. Fluid pressure positions the cylinders 27 in "in" or "out" position in response to the position of the valve 204. In spotting the carriages which carry the drive pistons we rely on directional valves 210, 211 which control the spotter cylinders 13 and 14 effective to move the carriages to align the axes of the driving cylinders 15 linearly with the spikes to be driven. The directional valves 210 and 211 control the cylinders 13 and 14. With these valves in neutral, double pilot operated check valves 212 lock the cylinders 13 and 14 in both directions, thus preventing the driving cylinder 15 from shifting while driving.

There being two drive cylinders on each carriage, a total of four, we illustrate four directional valves 215, 216, 217 and 218. Built-in relief valves in these valves determine maximum pressure.

We provide a turntable cylinder 220 controlled by a valve 221. However, the details and use of the turntable are unimportant in connection with the present invention and will not be further discussed.

It will be understood that the auxiliary hand pump, not shown, may be provided to operate the hydraulic system manually.

It will be realized that whereas we have described and illustrated a practical and operative device, nevertheless many changes may be made in the size, shape, number and disposition of parts, and in the location and proportioning of parts and elements, without departing from the spirit of our invention. Our description and drawings are therefore to be taken as in a broad sense illustrative or diagrammatic rather than as restrictive.

The use and operation of the invention are as follows:

A basic purpose of the invention is to drive spikes by an application of hydraulic force and not by any impacting or hammering action. We employ two carriages 12, each of which carries, in staggered relation, a pair of driving cylinders 15 each carrying a driving piston 17 which terminates in a spike contacting anvil 18. Drive cylinders and pistons are always normal to the tie and are adjusted in relation to the desired point of spike drive by the lateral movement, either transversely or longitudinally, of the carriage 12. These carriages may be accurately spotted above the location of the spikes to be driven over either or both rails. As above described, when the carriages are spotted and the controlling levers are moved to neutral, the hydraulic drive itself operates as a positive lock to prevent shifting of the driving cylinders.

Prior to apply the driving pressure to the spike we nip the tie to which the pressure is to be applied by inserting inwardly under the tie ends the hooks 25 with their tie contacting plates 26a. By then employing a sufficient force to raise the hooks against the under side of the tie we hold it firmly in position against the bottom of the rails without bending or rupturing the tie. The thrust upwardly against the bottoms of the tie ends is controlled by the above described hydraulic system, undue force being positively prevented.

The spikes to be fed are manually loaded in the trays 45, suitably supported on the frame, and are fed to a position beneath the anvils 18 to be there gripped between the jaws 60. The insertion of the spikes between the jaws is carried out as above described by the camming action resulting from the upward lift of the drive piston. The spikes are held by the spike-gripping jaws, ready for initial movement into the tie. After the piston, anvil, jaws and spike have made a predetermined downward excursion and the spike driven to a suitable depth in the tie, the downward movement of the jaw assembly is terminated and the piston and anvil pass the jaws and press the spike member home.

Thereafter, as the piston assembly rises, it cams the next following spike into driving position, to be gripped by the jaws in proper location.

The arrangement of the lost motion or spring link in the spike pusher linkage for plate 48 has the advantage that it will prevent damage due to jamming or damage due to two spikes trying to be forced into the jaws at the same time.

The present apparatus has the advantage that it can drive preset spikes or push spikes in that have come loose.

While it does not, as such, form part of the present invention, the hydraulic system employed is also effective to move the vehicle along the tracks in either direction, and, also, to actuate the turntable, which permits the vehicle to be removed from the tracks to permit the passage of trains.

We claim:

1. In a tie nipping assembly for railroad spike drivers, a vehicle movable along the rails of a track, a cross-structure on said vehicle, a nipper assembly pivoted to said cross-structure about an axis generally parallel to and outboard of the rails, said assembly including a piston and a cylinder, hydraulic means for actuating the cylinder and for thereby changing the effective length of the nipper assembly, a nipper hook pivoted to a lower portion of the piston for rotation about a horizontal axis extending in parallelism with the rail, a hydraulic cylinder and piston, and means for supplying fluid to the cylinder whereby to rotate the hook about its axis into and out of alignment beneath the end of a tie.

2. The structure of claim 1 characterized by the employment of means for adjusting the lower end of said assembly toward and away from the ends of ties of various sizes.

3. The structure of claim 1 characterized by the employment of means for supporting said assembly in inoperative retracted position.

4. The structure of claim 1 characterized by means for limiting the maximum pressure to which the first mentioned cylinder is subjected, whereby to prevent undesired upward pressure against the tie.

5. The structure of claim 1 characterized by means for limiting the maximum pressure to which the first mentioned cylinder is subjected, whereby to prevent undesired upward pressure against the tie, said means including a check valve which prevents the tie from moving away from the rail.

6. In a spike driving assembly, a vehicle movable along the rails of a track, a cross-structure on said vehicle located at a level substantially above the rails of the track, carriages on said cross-structure, each such carriage carrying one or more depending spike driving cylinders and pistons, and means for spotting said carriages above the spikes to be driven including hydraulic means for moving said carriages across the track, further hydraulic means for moving said carriages along the track, and means for locking said hydraulic means when a predetermined setting has been made.

7. The structure of claim 6 characterized in that each carriage includes a plurality of crossbars extending in parallelism with the rails, and a sub-carriage slidably movable along said cross-bars.

8. In a spike driving assembly, a vehicle movable along the rails of a track, a cross-structure on said vehicle located at a level substantially above the rails of the track, carriages on said cross-structure, each such carriage carrying one or more depending spike driving cylinders and pistons, and means for spotting said carriages above the spikes to be driven including hydraulic means for moving said carriages across the track, further hydraulic means for moving said carriages along the track, and means for locking said hydraulic means when a predetermined setting has been made, characterized in that the means for locking the hydraulic means are constituted by check valves.

9. In a spike driving assembly for driving spikes in railroad track, a vehicle movable along the rails of a track including a frame, a plurality of spike driving cylinders and pistons mounted on the frame constructed to be aligned with spikes to be driven, and nipper assemblies on each side of the frame, each having a nipper hook mounted for lateral movement generally perpendicular to the rails, the nipper hooks being positioned generally over the end of the ties and constructed for inward movement so as to be moved laterally inward under the outer end of the ties.

10. In a spike driving assembly, a vehicle movable along the rails of a track and including a frame, a plurality of spike driving cylinders and pistons mounted on the frame and constructed for generally horizontal movement to align them with spikes to be driven, a source of supply for feeding spikes in a defined direction offset from the spike driving pistons to an offset position generally adjacent the pistons, and a cross transfer mechanism for moving the spikes generally at right angles to the defined direction, one at a time, as they arrive at the offset position.

11. In a spike driving assembly, a vehicle movable along the rails of a track, a cross-structure on said vehicle located at a level substantially above the rails of the track, one or more spike driving cylinders and pistons depending from said cross-structure, a pair of spring biased jaws associated with each such piston, means for feeding to said jaws the spikes to be driven, a gravital feed hopper for spikes, and end plate against which said spikes are gravitally fed, a spike engaging cross plate mounted for movement in alignment with the jaws, and means responsive to the upward movement of the piston for moving said cross plate transversely of the end plate, whereby to urge a spike between the jaws, the jaws being formed to permit the spike entry.

12. The structure of claim 11 characterized by and including permanent magnet means for engaging the spike during the movement of the cross-plate.

13. The structure of claim 11 characterized by and including a pivoted actuating lever for the crossplate and a cam connection between said lever and the piston.

14. The structure of claim 11 characterized by and including a pivoted actuating lever for the cross-plate and a cam connection between said lever and the piston, and a biasing spring adapted normally to hold said lever in inoperative position.

15. In a spike driving assembly a vehicle movable on the rails of a track, including a frame, at least one carriage on the frame movably mounted thereon, a subcarriage on each carriage carrying one or more depending spike driving cylinders and pistons, means for spotting the driving cylinders and pistons above spikes to be driven including hydraulic means for moving each carriage in a defined linear direction, further hydraulic means for moving each subcarriage in a linear direction generally at right angles to the direction of movement of the carriage, and means for locking each carriage and subcarriage in position when a predetermined setting has been made.

References Cited

UNITED STATES PATENTS

| | | | |
|---|---|---|---|
| 2,925,048 | 2/1960 | McWilliams et al. | 104—17 |
| 3,257,962 | 6/1966 | Doorley et al. | 104—17 |
| 3,330,220 | 7/1967 | Stewart et al. | 104—17 |

ARTHUR L. LA POINT, *Primary Examiner.*

RICHARD A. BERTSCH, *Assistant Examiner.*